(12) United States Patent
Teranishi et al.

(10) Patent No.: US 6,455,666 B1
(45) Date of Patent: Sep. 24, 2002

(54) POLYESTERS AND PRODUCTION PROCESS THEREOF

(75) Inventors: Tadashi Teranishi, Himeji (JP); Shougang He, Himeji (JP); Kouichi Umemoto, Otake (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/973,801

(22) Filed: Oct. 11, 2001

(30) Foreign Application Priority Data

Oct. 11, 2000  (JP) ........................ 2000-310167
Oct. 11, 2000  (JP) ........................ 2000-310168
Oct. 11, 2000  (JP) ........................ 2000-310170

(51) Int. Cl.$^7$ ............................................. C08G 63/00
(52) U.S. Cl. ........................................ 528/307; 528/272
(58) Field of Search ........................ 528/272, 307

(56) References Cited

FOREIGN PATENT DOCUMENTS

| JP | 46-34628 | 10/1971 |
|----|----------|---------|
| JP | 50-21090 | 3/1975 |
| JP | 1-138225 | 5/1989 |
| JP | 2-38428 | 2/1990 |
| JP | 9-327626 | 12/1997 |
| JP | 11-35665 | 2/1999 |
| JP | 11-239730 | 9/1999 |

*Primary Examiner*—Samuel A. Acquah

(74) *Attorney, Agent, or Firm*—Birch, Stewart, Kolasch & Birch, LLP

(57) ABSTRACT

A polyester is a polycondensation product of (i) a diol component and (ii) a dicarboxylic acid component. In this polyester, the diol component (i) includes a tricyclo[$3.3.1.1^{3,7}$]decanediol of following Formula (1):

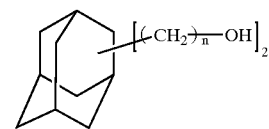

(1)

wherein n is 0 or a positive integer, and carbon atoms constituting a ring may each have a substituent, or the dicarboxylic acid component (ii) includes a tricyclo [$3.3.1.1^{3,7}$]decanedicarboxylic acid of following Formula (2):

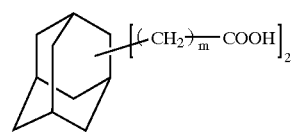

(2)

wherein m is 0 or a positive integer, and carbon atoms constituting a ring may each have a substituent. The polyester has high heat resistance, low water absorbency, excellent optical characteristics and satisfactory moldability.

14 Claims, 1 Drawing Sheet

POLYESTERS AND PRODUCTION PROCESS THEREOF

BACKGROUND OF THE INVENTION

1. Field of the Invention

The present invention relates to a novel polyester and a production process thereof. Specifically, it relates to a polyester having high heat resistance, low water absorbency, low optical anisotropy, and satisfactory formability (moldability), and to a production process of the polyester. The polyester is useful as, for example, an optical material, electronic information material and medical device material.

2. Description of the Related Art

Intensive investigations have been made for the application of plastics to optical materials, electronic information materials and medical device materials. Such plastics for use as optical materials or electronic information materials must have low optical anisotropy in addition to high transparency, low water absorbency and high heat resistance. Likewise, plastics for use as medical device materials must have high compatibility with blood, high mechanical strength and sufficient resistance to hydrolysis.

Polymethyl methacrylates, polycarbonates and amorphous polyolefins are used as the optical materials. However, the polymethyl methacrylates have high hygroscopicity to cause deformation such as warpage and have insufficient heat resistance, although they have excellent transparency and low optical anisotropy. The polycarbonates are high in optical anisotropy, although they are excellent in heat resistance. The amorphous polyolefins are insufficient in formability (moldability) and adhesive property, although they are low in optical anisotropy and are excellent in heat resistance.

Separately, attempts have been made to use polyesters as optical materials or electronic information materials. For example, Japanese Unexamined Patent Application Publication No. 1-138225 discloses a polyester resin obtained by using a diol or dicarboxylic acid having an aromatic ring in a side chain. Japanese Unexamined Patent Application Publication No. 2-38428 discloses a polyester copolymer obtained by using diphenyldicarboxylic acid as a dicarboxylic acid component. Japanese Unexamined Patent Application Publication No. 11-35665 discloses a polyester including a 2,2-norbornanedimethanol derivative, terephthalic acid, and other components. However, these resins do not always have high heat resistance, low water absorbency and satisfactory optical characteristics.

Polyesters each having an adamantane skeleton are also known. For example, Japanese Examined Patent Application Publication No. 46-34628 discloses a process for producing a linear polyester, in which a diol component containing adamantanediol is allowed to react with a dicarboxylic anhydride component containing an unsaturated carboxylic anhydride. However, the resulting resin obtained by this process is insufficient in heat resistance and transparency, although it can have stability against hydrolysis and against solvent by action of curing. Japanese Unexamined Patent Application Publication No. 50-21090 discloses a process for producing a polyester by polycondensation of a dihydroxyadamantane with an aromatic dicarboxylic acid. However, the resulting polyester does not always have sufficiently low water absorbency and excellent optical characteristics, although it has excellent formability.

SUMMARY OF THE INVENTION

Accordingly, an object of the present invention is to provide a novel polyester that has high heat resistance, low water absorbency, satisfactory optical characteristics and excellent formability, and to provide a production process of the polyester.

After intensive investigations to achieve the above objects, the present inventors have found that a polyester resin having a specific structure has high heat resistance, low water absorbency, satisfactory optical characteristics and excellent formability (moldability). The present invention has been accomplished based on these findings.

Specifically, the present invention provides, in one aspect, a polyester that is a polycondensation product of a diol component (i) and a dicarboxylic acid component (ii). In the polyester, the diol component (i) includes a tricyclo[$3.3.1.1^{3,7}$]decanediol represented by following Formula (1):

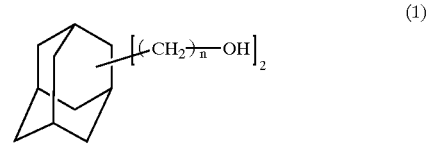

(1)

wherein n is 0 or a positive integer, and carbon atoms constituting a ring may each have a substituent; or the dicarboxylic acid component (ii) includes a tricyclo[$3.3.1.1^{3,7}$]decanedicarboxylic acid represented by following Formula (2):

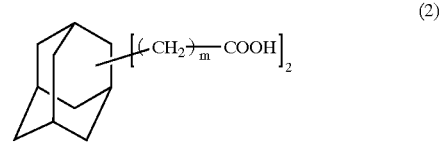

(2)

wherein m is 0 or a positive integer, and carbon atoms constituting a ring may each have a substituent.

The polyester includes, for example, a polyester obtained by polycondensation of the diol component (i) containing the tricyclo[$3.3.1.1^{3,7}$]decanediol of Formula (1) and the dicarboxylic acid component (ii) containing the tricyclo[$3.3.1.1^{3,7}$]decanedicarboxylic acid of Formula (2).

In another aspect, the present invention provides a process for producing a polyester. The process includes the step of subjecting a diol component (i) to polycondensation with a dicarboxylic acid component (ii) or a reactive derivative thereof, in which a diol component including the tricyclo[$3.3.1.1^{3,7}$]decanediol of Formula (1) is used as the diol component (i), or a dicarboxylic acid component including the tricyclo[$3.3.1.1^{3,7}$]decanedicarboxylic acid of Formula (2) is used as the dicarboxylic acid component (ii).

Preferably in this production process, a diol component containing the tricyclo[$3.3.1.1^{3,7}$]decanediol of Formula (1) as the diol component (i) is subjected to polycondensation with a dicarboxylic acid component, or a reactive derivative thereof, including the tricyclo[$3.3.1.1^{3,7}$]decanedicarboxylic acid of Formula (2) as the dicarboxylic acid component (ii).

As the diol component (i), a diol component containing a tricyclo[3.3.1.1³,⁷]decanediol represented by following Formula (1a):

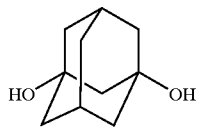

(1a)

wherein carbon atoms constituting a ring may each have a substituent, can be used. As the dicarboxylic acid component (ii), a dicarboxylic acid component containing a tricyclo[3.3.1.1³,⁷]decanedicarboxylic acid represented by following Formula (2a):

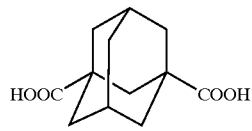

(2a)

wherein carbon atoms constituting a ring may each have a substituent, can be used.

The polyester of the present invention has a bulky alicyclic structure and has high heat resistance, low water absorbency, satisfactory optical characteristics, and excellent formability. Accordingly, the polyester is useful as a material for an optical disk, lens, optical connector, and other optical-electronic information devices, as well as a material for a transfusion solution kit, catheter, syringe, vacuum blood collecting tube, and other medical devices.

DESCRIPTION OF THE PREFERRED EMBODIMENTS

Diol Component (i)

Figure 1:
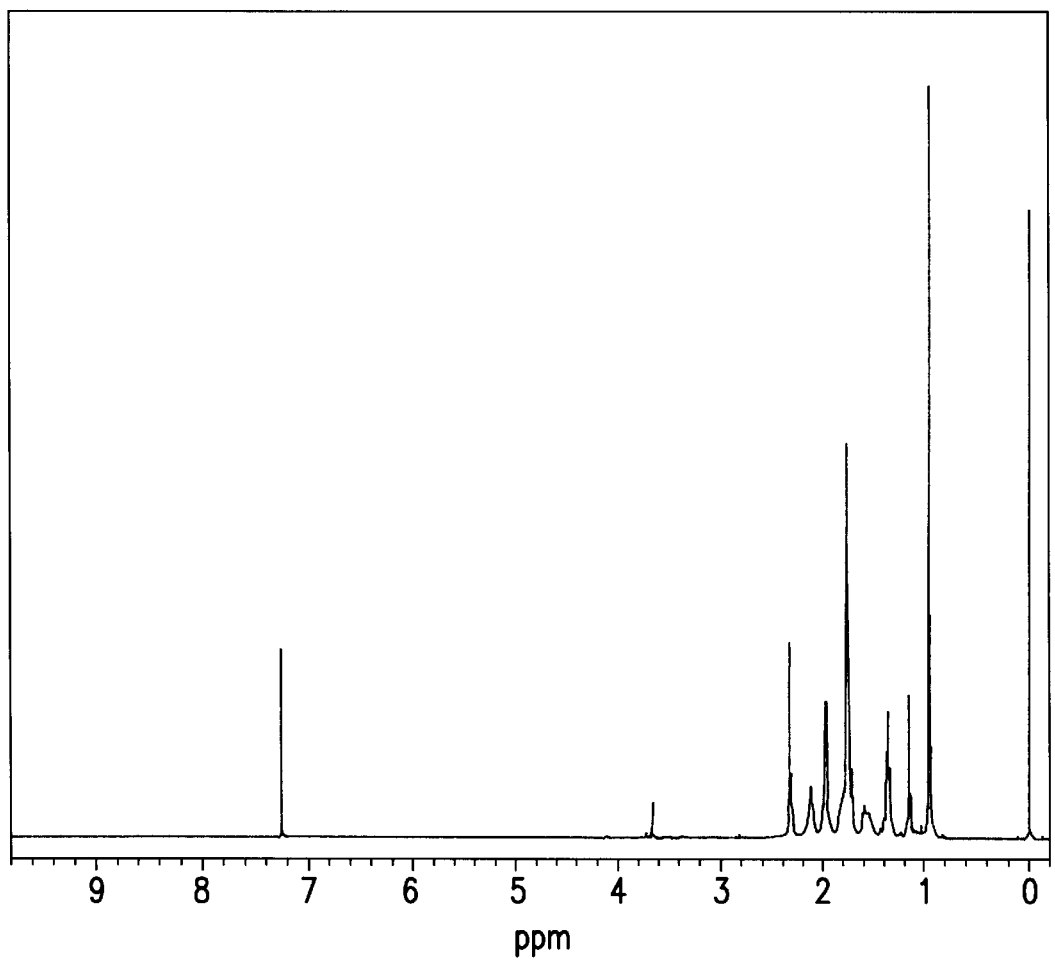
FIG. 1 is a ¹H-NMR spectrum of a polymer obtained in Example 1 below.

Diol components each containing a tricyclo[3.3.1.1³,⁷]decanediol of Formula (1) (hereinafter may be referred to as "adamantanediol") can be used as the diol components (i) constituting the polyesters of the present invention.

In Formula (1), n is 0 or a positive integer. The repetition number n is, for example, 0 or a positive integer of less than or equal to 10, preferably 0 or a positive integer of less than or equal to 5, and specifically preferably 0 or 1.

A functional group bonded to an adamantane skeleton is a hydroxyalkyl group or a hydroxyl group. The functional group is preferably bonded at a bridgehead position of the adamantane skeleton.

Carbon atoms constituting the ring (carbon atoms at a bridgehead position or non-bridgehead position, especially carbon atoms at a bridgehead position) in Formula (1) may each have a substituent. Such substituents include, but are not limited to, methyl, ethyl, propyl, isopropyl, butyl, pentyl, hexyl, decyl, and other alkyl groups (e.g., $C_1$–$C_{10}$ alkyl groups, and preferably $C_1$–$C_4$ alkyl groups); cyclopentyl, cyclohexyl, and other cycloalkyl groups; phenyl, naphthyl, and other aryl groups; methoxy, ethoxy, isopropoxy, and other alkoxy groups (e.g., $C_1$–$C_4$ alkoxy groups); methoxycarbonyl, ethoxycarbonyl, isopropoxycarbonyl, and other alkoxycarbonyl groups (e.g., $C_1$–$C_4$ alkoxycarbonyl groups); acetyl, propionyl, butyryl, benzoyl, and other acyl groups; hydroxyl group; carboxyl group; nitro group; substituted or unsubstituted amino groups; halogen atoms; and oxo group.

Of the adamantanediols of Formula (1), preferred are tricyclo[3.3.1.1³,⁷]decane-1,3-diol (1,3-adamantanediol), 5,7-dimethyl-tricyclo[3.3.1.1³,⁷]decane-1,3-diol (1,3-dihydroxy-5,7-dimethyladamantane) and other tricyclo[3.3.1.1³,⁷]decanediols of Formula (1a) (1,3-adamantanediols which may have a substituent). Among them, 5,7-dimethyl-tricyclo[3.3.1.1³,⁷]decane-1,3-diol is typically preferred.

Among the adamantanediols of Formula (1), examples of adamantanediols, where n is a positive integer, include 1,3-adamantanedimethanol [1,3-bis(hydroxymethyl)adamantane] and 1,3-dimethyl-5,7-adamantanedimethanol [1,3-dimethyl-5,7-bis(hydroxymethyl)adamantane].

The adamantanediols of Formula (1) can be prepared in the following manner. For example, an adamantanediol having two hydroxyl groups at the bridgehead positions of the adamantane ring can be obtained by oxidizing a corresponding adamantane (an adamantane compound having hydrogen atoms bonded to at least two carbon atoms at bridgehead positions of an adamantane ring) and thereby introducing two hydroxyl groups into the bridgehead positions of the adamantane ring.

Likewise, an adamantanediol of Formula (1), where n is 1, can be prepared by reducing a corresponding adamantane (an adamantane compound having carboxyl groups bonded to at least two carbon atoms at bridgehead positions of an adamantane ring) and thereby reducing the carboxyl groups in the adamantane ring into hydroxyl groups. The adamantane compound having carboxyl groups bonded to at least two carbon atoms at bridgehead positions of the adamantane ring can be obtained by carboxylating a corresponding adamantane (an adamantane compound having hydrogen atoms bonded to at least two carbon atoms at bridgehead positions of an adamantane ring) and thereby introducing two carboxyl groups into the bridgehead positions of the adamantane ring.

The adamantanediol can be obtained by oxidation of the adamantane in accordance with known or conventional oxidation processes. In view of reaction yield and operability, the adamantanediol is preferably obtained by a process, in which the adamantane is oxidized with molecular oxygen by catalysis of an N-hydroxyimide compound (refer to Japanese Unexamined Patent Application Publication No. 9-327626).

More specifically, two hydroxyl groups can be introduced into the bridgehead positions of the adamantane ring by bringing the adamantane into contact with oxygen in the presence of the N-hydroxyimide catalyst such as N-hydroxyphthalimide, and where necessary, a metallic promoter (co-catalyst) such as a cobalt compound (e.g., cobalt acetate or acetylacetonatocobalt). In this process, the amount of the N-hydroxyimide catalyst is, for example, from about 0.000001 to about 1 mole, and preferably from about 0.00001 to about 0.5 mole, relative to 1 mole of the adamantane. The amount of the metallic promoter is, for example, from about 0.0001 to about 0.7 mole, and preferably from about 0.001 to about 0.5 mole, relative to 1 mole of the adamantane. As the oxygen, pure oxygen, oxygen diluted with an inert gas, or air can be used. The oxygen is often used in excess to the adamantane. A reaction can be performed in a solvent at a temperature of from about 0° C.

to about 200° C. and preferably from about 30° C. to about 150° C. at atmospheric pressure or under a pressure (under a load). Such solvents include, for example, acetic acid and other organic acids, acetonitrile and other nitriles, and dichloroethane and other halogenated hydrocarbons. The resulting adamantanediol can be separated and purified by conventional separation and purification means such as concentration, filtration, extraction, crystallization, recrystallization, distillation and column chromatography.

Each of the adamantanediols of Formula (1) can be used alone or in combination in the present invention. Other diol components can be used as the diol component (i) constituting the polyester of the present invention, in addition to, or instead of, the adamantanediols of Formula (1). Such other diol components include diols for use in materials for conventional polyesters, such as ethylene glycol, 1,3-propanediol, 2,2-dimethyl-1,3-propanediol, 1,4-butanediol, 1,5-pentanediol, 1,6-hexanediol, and other aliphatic diols; 1,4-cyclohexanediol, 1,3-cyclohexanediol, 1,2-cyclohexanediol, 2-methyl-1,1-cyclohexanediol, 1,1'-bicyclohexyl-4,4'-diol, 4,4'-isopropylidenecyclohexanol, bicyclo[2.2.1]heptane-2,3-diol, bicyclo[2.2.1]heptane-2,5-diol, bicyclo[2.2.1]heptane-2,6-diol, bicyclo[4.4.0]decane-1,6-diol, bicyclo[4.4.0]decane-2,7-diol, 1,4-cyclohexanedimethanol, 1,3-cyclohexanedimethanol, 1,2-cyclohexanedimethanol, 3-methyl-bicyclo[2.2.1]heptane-2,2-dimethanol, bicyclo[2.2.1]heptane-2,5-dimethanol, bicyclo[2.2.1]heptane-2,6-dimethanol, tricyclo[5.2.1.0$^{2,6}$]decane-4,8-dimethanol, and other alicyclic diols; hydroquinone, catechol, resorcin, naphthalenediol, xylylenediol, bisphenol A, an ethylene oxide adduct of bisphenol A, bisphenol S, an ethylene oxide adduct of bisphenol S, and other aromatic diols; diethylene glycol, triethylene glycol, polyethylene glycol, dipropylene glycol, and other ether glycols. Among them, 1,4-cyclohexanedimethanol and other alicyclic diols are preferred. Each of these diol components can be used alone or in combination.

The proportion of the adamantanediols of Formula (1) in the overall diol components constituting the polyester of the present invention can be freely selected and is generally from about 1% to about 100% by mole, preferably from about 5% to about 100% by mole, and more preferably from about 10% to about 100% by mole. When the dicarboxylic acid component containing the tricyclo[3.3.1.1$^{3,7}$] decanedicarboxylic acid of Formula (2) is used as the dicarboxylic acid component (ii), the diol component (i) does not necessarily contain the adamantanediols of Formula (1).

Dicarboxylic Acid Component (ii)

Dicarboxylic acid components each containing a tricyclo[3.3.1.1$^{3,7}$]decanedicarboxylic acid of Formula (2) (an adamantanedicarboxylic acid; hereinafter may be referred to as "adamantanedicarboxylic acid") can be used as the dicarboxylic acid component (ii) constituting the polyester of the present invention.

In Formula (2), m is 0 or a positive integer. The repetition number m is, for example, 0 or a positive integer of less than or equal to 10, preferably 0 or a positive integer of less than or equal to 5, and specifically preferably 0 or 1.

A functional group bonded to an adamantane skeleton is a carboxyalkyl group or a carboxyl group. The functional group is preferably bonded at a bridgehead position of the adamantane skeleton.

The carbon atoms constituting the ring (carbon atoms at bridgehead positions or non-bridgehead positions, especially carbon atoms at bridgehead positions) in Formula (2) may each have a substituent. Such substituents include substituents similar to those which the carbon atoms constituting the adamantane ring in the compound of Formula (1) may have.

Of the adamantanedicarboxylic acids of Formula (2), preferred are tricyclo[3.3.1.1$^{3,7}$]decane-1,3-dicarboxylic acid (1,3-adamantanedicarboxylic acid), 5,7-dimethyl-tricyclo[3.3.1.1$^{3,7}$]decane-1,3-dicarboxylic acid (1,3-dicarboxy-5,7-dimethyladamantane), and other tricyclo[3.3.1.1$^{3,7}$]decanedicarboxylic acids of Formula (2a) (1,3-adamantanedicarboxylic acids which may have a substituent). Among them, 5,7-dimethyl-tricyclo[3.3.1.1$^{3,7}$]decane-1,3-dicarboxylic acid is typically preferred.

Of the adamantanedicarboxylic acids of Formula (2), examples of adamantanedicarboxylic acids, where m is a positive integer, include 1,3-bis(carboxymethyl)adamantane and 1,3-dimethyl-5,7-bis(carboxymethyl)adamantane.

The adamantanedicarboxylic acids of Formula (2) can be prepared in the following manner. For example, an adamantanedicarboxylic acid having two carboxyl groups at bridgehead positions of the adamantane ring can be obtained by carboxylating a corresponding adamantane (an adamantane compound having hydrogen atoms bonded to at least two carbon atoms at bridgehead positions of an adamantane ring) and thereby introducing two carboxyl groups into the bridgehead positions of the adamantane ring. Alternatively, this compound can be obtained by oxidizing an adamantane compound having hydroxymethyl groups bonded to at least two carbon atoms at bridgehead positions of an adamantane ring.

Of the adamantanedicarboxylic acids of Formula (2), an adamantanedicarboxylic acid, where m is 1 (e.g., 1,3-bis(carboxymethyl)adamantane), can be prepared by oxidizing an adamantane compound having hydroxyethyl groups bonded to at least two carbon atoms at bridgehead positions of an adamantane ring.

The adamantanedicarboxylic acid can be obtained by oxidation of the corresponding adamantane in accordance with known or conventional oxidation processes. In view of reaction yield and operability, the adamantanedicarboxylic acid is preferably obtained by a process in which the adamantane is oxidized with molecular oxygen by catalysis of an N-hydroxyimide compound (refer to Japanese Unexamined Patent Application Publication No. 9-327626).

The adamantane can be carboxylated in accordance with known or conventional carboxylation processes. Preferably, the adamantane is carboxylated by a carboxylation process in which the adamantane is subjected to carboxylation reaction with oxygen and carbon monoxide by catalysis of an N-hydroxyimide compound, as disclosed in Japanese Unexamined Patent Application Publication No. 11-239730. This carboxylation process can efficiently introduce carboxyl groups into an adamantane ring and thereby yield the adamantanedicarboxylic acid.

More specifically, two carboxyl groups can be introduced into the bridgehead positions of the adamantane ring by bringing the adamantane into contact with oxygen and carbon monoxide in the presence of the N-hydroxyimide catalyst such as N-hydroxyphthalimide, and where necessary a metallic promoter (co-catalyst) such as a cobalt compound (e.g., cobalt acetate or acetylacetonatocobalt). In this process, the amount of the N-hydroxyimide catalyst is, for example, from about 0.000001 to about 1 mole, and preferably from about 0.00001 to about 0.5 mole, relative to 1 mole of the adamantane. The amount of the metallic promoter is, for example, from about 0.0001 to about 0.7 mole, and preferably from about 0.001 to about 0.5 mole, relative to 1 mole of the adamantane. As the oxygen and carbon monoxide, pure oxygen and carbon monoxide can be used. Alternatively, oxygen and carbon monoxide diluted with an inert gas can be used. The oxygen can also be derived from air. The amounts of and the ratio of the oxygen to carbon monoxide are not specifically limited, and the oxygen and carbon monoxide can be used in excess relative to the adamantane. It is advantageous to use carbon monoxide in excess to the oxygen. A reaction can be performed in a solvent at a temperature of from about 0° C. to about 200° C., and preferably from about 30° C. to about 150° C. at atmospheric pressure or under a pressure (under a load). Such solvents include, for example, acetic acid and other organic acids, acetonitrile and other nitriles, and dichloroethane and other halogenated hydrocarbons. The prepared adamantanedicarboxylic acid can be separated and purified by conventional separation and purification means such as concentration, filtration, extraction, crystallization, recrystallization, distillation and column chromatography.

Each of the adamantanedicarboxylic acids of Formula (2) can be used alone or in combination in the present invention. Other dicarboxylic acid components can be used as the dicarboxylic acid component (ii) constituting the polyester of the present invention, in addition to, or instead of, the adamantanedicarboxylic acids of Formula (2). Such dicarboxylic acid components include those generally used in materials for polyesters, such as terephthalic acid, isophthalic acid, phthalic acid, 2,6-naphthalenedicarboxylic acid, 4,4'-biphenyldicarboxylic acid, 4,4'-diphenyl ether dicarboxylic acid, 4,4'-diphenylmethanedicarboxylic acid, 4,4'-diphenyl sulfonedicarboxylic acid, 4,4'-diphenylisopropylidenedicarboxylic acid, 1,2-diphenoxyethane-4',4"-dicarboxylic acid, anthracenedicarboxylic acid, 2,5-pyridinedicarboxylic acid, diphenyl ketone dicarboxylic acid, and other aromatic dicarboxylic acids; oxalic acid, succinic acid, glutaric acid, adipic acid, azelaic acid, sebacic acid, and other aliphatic dicarboxylic acids; 1,2-cyclohexanedicarboxylic acid, 1,3-cyclohexanedicarboxylic acid, 1,4-cyclohexanedicarboxylic acid, and other cyclohexanedicarboxylic acids, and bicyclo[2.2.1]heptane-2,3-dicarboxylic acid, bicyclo[2.2.1]heptane-2,5-dicarboxylic acid, bicyclo[2.2.1]heptane-2,6-dicarboxylic acid, tricyclo[5.2.1.0$^{2,6}$]decane-4,8-dicarboxylic acid, and other alicyclic dicarboxylic acids. Among them, alicyclic dicarboxylic acids are preferred. Each of these dicarboxylic acid components can be used alone or in combination. There are cis-isomers and trans-isomers in the cyclohexanedicarboxylic acids. Each of the cis-isomer and the trans-isomer can be used alone or in combination as a mixture. The molar ratio of the cis-isomer to the trans-isomer can appropriately be selected within a range from 0:100 to 100:0.

The ratio of the adamantanedicarboxylic acids of Formula (2) in the total dicarboxylic acid components constituting the polyester of the present invention can freely be selected and is generally from about 1% to about 100% by mole, preferably from about 5% to about 100% by mole, and more preferably from about 10% to about 100% by mole. When the diol component containing the tricyclo[3.3.1.1$^{3,7}$]decanediol of Formula (1) is used as the diol component (i), the dicarboxylic acid component does not necessarily comprise the adamantanedicarboxylic acids of Formula (2).

The polyester of the present invention is preferably a polyester which is free from a component having a polymerizable double bond as the dicarboxylic acid component. It is typically preferably a saturated polyester (a thermoplastic polyester) composed of a dicarboxylic acid component and a diol component each having no polymerizable double bond.

The number average molecular weight of the polyester is, for example, from about 1000 to about 150000 and preferably from about 3000 to about 100000.

In order to yield satisfactory mechanical strength as a molded article, the reduced viscosity of the polyester of the present invention is preferably about 0.5 or more, as determined in a mixed solution of phenol and 1,1,2,2-tetrachloroethane (weight ratio: 4:6) in a concentration of 1.2 g/dl at a temperature of 35° C.

The polyester of the present invention can be produced by polycondensation of a diol component containing the adamantanediol of Formula (1) with a dicarboxylic acid component, which may include the adamantanedicarboxylic acid of Formula (2), or a reactive derivative thereof. Alternatively, it can be obtained by polycondensation of a diol component, which may include the adamantanediol of Formula (1), with a dicarboxylic acid component containing the adamantanedicarboxylic acid of Formula (2), or a reactive derivative thereof.

Such reactive derivatives of the dicarboxylic acid components include, for example, dicarboxylic esters, dicarboxylic anhydrides and dicarbonyl halides (e.g., dicarbonyl chlorides). These dicarboxylic esters, dicarboxylic anhydrides, and dicarbonyl halides can be obtained from corresponding dicarboxylic acids in accordance with conventional techniques.

The procedure of a general production process of a polyester can be applied to production of the polyester of the present invention. For example, when a free dicarboxylic acid or carboxylic anhydride is used as a starting material, the polyester can be produced by heating a diol component and the dicarboxylic acid or dicarboxylic anhydride in a reactor and distilling off water produced by action of a reaction out of the reaction system. This reaction does not always require a catalyst, but the use of a catalyst can accelerate the reaction. Such catalysts include, but are not limited to, acetates, carbonates, hydroxides, and alkoxides of alkali metals, alkaline earth metals, zinc, titanium, cobalt, manganese, and other metals. A reaction temperature is from about 120° C. to about 300° C., and preferably from about 160° C. to about 300° C. The reaction (esterification reaction) is generally performed at atmospheric pressure, but may be performed under a reduced pressure to enhance distilling-off of water and excessive diol component. The molar ratio of the diol component to the dicarboxylic acid or dicarboxylic anhydride may be about 1, but the diol component may be used in excess to yield a high molecular weight polyester.

When a dicarboxylic ester is used as a starting material, the polyester can be produced by placing the diol component, the dicarboxylic ester and a catalyst in a reactor and distilling off an alcohol produced by the reaction out of the reaction system. Such dicarboxylic esters include, for example, methyl esters, ethyl esters, propyl esters, and butyl esters of dicarboxylic acids, of which methyl esters are typically preferred from the viewpoints of the easiness and cost of the reaction. The catalyst includes, but is not limited to, carboxylates, carbonates, hydroxides, alkoxides, and oxides of alkali metals, alkaline earth metals, zinc, lead, titanium, cobalt, manganese, tin, antimony, germanium, and other metals. A reaction temperature is from about 120° C. to about 300° C., and preferably from about 160° C. to about 300° C. The reaction (esterification reaction) is generally performed at atmospheric pressure, but may be performed under a reduced pressure to enhance distilling-off of the alcohol. The molar ratio of the diol component to the dicarboxylic ester may be about 1, but the diol component may be used in excess to yield a high molecular weight polyester.

Using a dicarbonyl chloride or another dicarbonyl halide as a starting material, the polyester can be obtained, for example, by (A) a process in which the diol component and the dicarbonyl halide are allowed to react at high temperatures in the absence of a solvent, and a produced hydrogen halide is distilled off; or by (B) a process in which the diol component and the dicarbonyl halide are allowed to react at low temperatures in a solvent, and a produced hydrogen halide is distilled off or is neutralized with a basic substance. A reaction temperature can be appropriately selected within a range of from about 0° C. to about 280° C.

Solvents for use in the process (B) are not specifically limited, as far as they are inert toward the reaction. Such solvents include, for example, dichloromethane, chloroform, 1,2-dichloroethane, monochlorobenzene, trichlorobenzene, and other halogenated hydrocarbons; benzene, toluene, xylene, and other aromatic hydrocarbons; tetrahydrofuran, dioxane, dimethoxyethane, and other ethers; acetone, ethyl methyl ketone, isobutyl methyl ketone, cyclohexanone, and other ketones; ethyl acetate, butyl acetate, and other esters; acetonitrile, and other nitrites; N,N-dimethylformamide, N,N-dimethylacetamide, N-methyl-2-pyrrolidone, and other amides; dimethyl sulfoxide, and other sulfoxides; 1,3-dimethyl-2-imidazoline, and other imidazolines; and hexanemethylphosphoramide. The basic substance includes, but is not limited to, triethylamine, tributylamine, N,N-dimethylaniline, and other tertiary amines; pyridine, α-picoline, β-picoline, γ-picoline, quinoline, and other basic nitrogen-containing heterocyclic compounds; sodium hydroxide, potassium hydroxide, and other alkali metal hydroxides; sodium acetate, sodium carbonate, sodium hydrogencarbonate, potassium acetate, potassium carbonate, and other alkali metal salts. Some of the aforementioned solvents such as N-methyl-2-pyrrolidone also serve as the basic substance.

The polyester formed by polymerization can be isolated by a conventional technique such as filtration, concentration, precipitation, crystallization, and cooling-solidification.

The present invention will now be illustrated in further detail with reference to several examples below, which are not intended to limit the scope of the invention. In the following examples, the number average molecular weight (Mn) and the molecular weight distribution (Mw/Mn) of the resulting polymer were determined by gel permeation chromatography (GPC). The melting point (Tm) and the 5% weight reduction temperature in nitrogen ($Td_5$) of the polymer were determined by differential scanning calorimetry (DSC) using a differential scanning calorimeter and thermogravimetric analysis-differential thermal analysis (TG-DTA) using a thermobalance, respectively.

EXAMPLE 1

In a 50-ml flask, 1.96 g of 5,7-dimethyl-tricyclo[$3.3.1.1^{3,7}$]decane-1,3-diol and 5 ml of dried N-methyl-2-pyrrolidone were placed. To the resulting mixture, a solution mixture of 2.09 g of 1,4-cyclohexanedicarbonyl chloride [cis/trans=49.7/50.3] and 5 ml of dried N-methyl-2-pyrrolidone was added dropwise at room temperature over 15 minutes with stirring. After the completion of addition, the resulting mixture was allowed to react at 100° C. for 3 hours. After the completion of polymerization, the reaction mixture was added dropwise in small increments to 500 ml of methanol to precipitate a produced polymer. The precipitated polymer was filtrated, was rinsed, was dried in vacuo and thereby yielded 3.4 g of a white polyester. The resulting polymer had a number average molecular weight (Mn) of 5380, a molecular weight distribution (Mw/Mn) of 2.14, a glass transition temperature (Tg) of 159.7° C., a melting point (Tm) of 264.1° C. and a heat decomposition temperature of 420.2° C. The $^1$H-NMR spectrum (solvent: $CDCl_3$) of the above-prepared polymer is shown in FIG. 1.

EXAMPLE 2

In a 50-ml flask, 1.01 g of 5,7-dimethyl-tricyclo[$3.3.1.1^{3,7}$]decane-1,3-diol, 0.73 g of 1,4-cyclohexanedimethanol [cis/trans=27.1/72.9] and 5 ml of dried N-methyl-2-pyrrolidone were placed. To the resulting mixture, a solution mixture of 2.09 g of 1,4-cyclohexanedicarbonyl chloride [cis/trans=49.7/50.3] and 5 ml of dried N-methyl-2-pyrrolidone was added dropwise at room temperature over 15 minutes with stirring. After the completion of addition, the resulting mixture was allowed to react at 100° C. for 3 hours. After the completion of polymerization, the reaction mixture was added dropwise in small increments to 500 ml of methanol to precipitate a produced polymer. The precipitated polymer was filtrated, was rinsed, was dried in vacuo and thereby yielded 2.6 g of a white polyester. The resulting polymer had a Mn of 4860, an Mw/Mn of 1.92 and a Tg of 105.3° C.

EXAMPLE 3

Previously, 1,4-cyclohexanedicarbonyl chloride was prepared by allowing 1,4-cyclohexanedicarboxylic acid to react with thionyl chloride and purifying a reaction product by distillation. In a 50-ml flask in an atmosphere of dried nitrogen gas, 2.09 g of the 1,4-cyclohexanedicarbonyl chloride and 10 mL of dried monochlorobenzene were placed. To the resulting mixture, a solution mixture of 1.68 g of tricyclo[$3.3.1.1^{3,7}$]decane-1,3-diol and 5 mL of dried pyridine was added dropwise at room temperature over 5 minutes with stirring. After the completion of addition, the resulting mixture was allowed to react at 80° C. for 2 hours. After the completion of polymerization, the reaction mixture was added dropwise in small increments to 500 ml of methanol. The resulting polymer was filtrated, was rinsed with methanol, was dried in vacuo and thereby yielded a white polyester. The resulting polymer had a Mn of 16000, a Mw/Mn of 2.5, a Tg of 105° C. and a $Td_5$ of 385° C.

EXAMPLE 4

A polyester was prepared by performing a reaction in a similar manner as in Example 3, except that 1.96 g of 5,7-dimethyl-tricyclo[$3.3.1.1^{3,7}$]decane-1,3-diol was used as the adamantanediol. The resulting polymer had an Mn of 17000, an Mw/Mn of 2.5, a Tg of 170° C. and a $Td_5$ of 430° C.

EXAMPLE 5

A polyester was prepared by performing a reaction in a similar manner as in Example 3, except that 1.83 g of adipoyl chloride and 1.96 g of 5,7-dimethyl-tricyclo[$3.3.1.1^{3,7}$]decane-1,3-diol were used as the dicarboxylic acid component and the adamantanediol, respectively. The resulting polymer had an Mn of 10000, an Mw/Mn of 2.5, a Tg of 44° C. and a $Td_5$ of 410° C.

EXAMPLE 6

A polyester was prepared by performing a reaction in a similar manner as in Example 3, except that 2.21 g of bicyclo[2.2.1]heptane-2,5-dicarbonyl chloride and 1.96 g of 5,7-dimethyl-tricyclo[3.3.1.1$^{3,7}$]decane-1,3-diol were used as the dicarboxylic acid component and the adamantanediol, respectively. The resulting polymer had an Mn of 6000, an Mw/Mn of 2.2, a Tg of 172° C. and a Td$_5$ of 420° C.

EXAMPLE 7

A polyester was prepared by performing a reaction in a similar manner as in Example 3, except that 2.61 g of tricyclo[5.2.1.0$^{2,6}$]decane-4,8-dicarbonyl chloride and 1.96 g of 5,7-dimethyl-tricyclo[3.3.1.1$^{3,7}$]decane-1,3-diol were used as the dicarboxylic acid component and the adamantanediol, respectively. The resulting polymer had an Mn of 5000, an Mw/Mn of 2.2, a Tg of 135° C. and a Td$_5$ of 360° C.

EXAMPLE 8

Previously, tricyclo[3.3.1.1$^{3,7}$]decane-1,3-dicarbonyl chloride was prepared by allowing tricyclo[3.3.1.1$^{3,7}$] decane-1,3-dicarboxylic acid to react with thionyl chloride and purifying a reaction product by distillation. In a 50-ml flask in an atmosphere of dried nitrogen gas, 2.61 g of the tricyclo[3.3.1.1$^{3,7}$]decane-1,3-dicarbonyl chloride and 10 mL of dried monochlorobenzene were placed. To the resulting mixture, a solution mixture of 1.44 g of 1,4-cyclohexanedimethanol and 5 mL of dried pyridine was added dropwise at room temperature over 5 minutes with stirring. After the completion of addition, the resulting mixture was allowed to react at 80° C. for 2 hours. After the completion of polymerization, the reaction mixture was added dropwise in small increments to 500 ml of methanol. The polymer had an Mn of 29000, an Mw/Mn of 2.5, a Tg of 74° C. and a Td$_5$ of 410° C.

EXAMPLE 9

A polyester was prepared by performing a reaction in a similar manner as in Example 8, except that 1.16 g of 1,4-cyclohexanediol was used as the diol component. The resulting polymer had an Mn of 5000, an Mw/Mn of 2.3, a Tg of 49° C. and a Td$_5$ of 340° C.

EXAMPLE 10

A polyester was prepared by performing a reaction in a similar manner as in Example 8, except that 1.16 g of 1,2-cyclohexanediol was used as the diol component. The resulting polymer had an Mn of 5000, an Mw/Mn of 2.2, a Tg of 114° C. and a Td$_5$ of 350° C.

EXAMPLE 11

A polyester was prepared by performing a reaction in a similar manner as in Example 8, except that 1.56 g of bicyclo[2.2.1]heptane-2,5-dimethanol was used as the diol component. The resulting polymer had an Mn of 20000, an Mw/Mn of 2.6, a Tg of 91° C. and a Td$_5$ of 420° C.

EXAMPLE 12

A polyester was prepared by performing a reaction in a similar manner as in Example 8, except that 1.96 g of tricyclo[5.2.1.0$^{2,6}$]decane-4,8-dimethanol was used as the diol component. The resulting polymer had an Mn of 5000, an Mw/Mn of 2.4, a Tg of 88° C. and a Td$_5$ of 390° C.

EXAMPLE 13

In a 200-ml flask, 4.49 g of tricyclo[3.3.1.1$^{3,7}$]decane-1,3-dicarboxylic acid and 3.46 g of 1,4-cyclohexanedimethanol were placed, and to the resulting mixture, 0.011 g of tetraisopropyl titanate was added under flow of dried nitrogen gas. The resulting mixture was gradually heated to 200° C. and was stirred for about 1 hour. The system was then evacuated, the mixture was gradually heated to 280° C. with stirring and a polymerization reaction was performed for 8 hours. After the completion of polymerization, the reaction mixture was dissolved in 100 ml of chloroform, was added dropwise in small increments to 1500 ml of methanol, the resulting polymer was filtrated and was rinsed with methanol, was dried in vacuo and thereby yielded a polyester. The resulting polymer had an Mn of 49000, an Mw/Mn of 2.5, a Tg of 77° C. and a Td$_5$ of 410° C.

EXAMPLE 14

In a three-neck flask equipped with a condenser and a stirrer, 4.49 g of tricyclo[3.3.1.1$^{3,7}$]decane-1,3-dicarboxylic acid and 3.46 g of 1,4-cyclohexanedimethanol were placed. To the resulting mixture, 0.021 g of 1-chloro-3-hydroxy-1,1,3,3-tetra-n-butyldistannoxane was added under flow of dried nitrogen gas. The resulting mixture was heated to 200° C., was stirred for about 1 hour and thereby yielded a homogenous mixture. Additionally, 30 ml of decalin was added thereto and thereby yielded two-phase mixture. The resulting mixture was stirred under reflux of decalin for 60 hours to perform a polycondensation reaction. After the completion of the reaction, decalin was removed by flowing out, the reaction mixture was dissolved in 100 ml of chloroform, was added dropwise in small increments to 1500 ml of methanol, the resulting polymer was filtrated, was rinsed with methanol, was dried in vacuo and thereby yielded a white polyester. The polyester was stirred with methanol for 12 hours. The resulting white powdery polymer was separated by filtration, was dried at 60° C. under a reduced pressure and thereby yielded a polyester. The polymer had an Mn of 14000, an Mw/Mn of 2.3, a Tg of 73° C. and a Td$_5$ of 410° C.

EXAMPLE 15

A polyester was prepared by performing a reaction in a similar manner as in Example 8, except that 1.70 g of bicyclo[5.2.1]decane-2,6-diol was used as the diol component. The resulting polymer had an Mn of 12000, an Mw/Mn of 2.6, a Tg of 130° C. and a Td$_5$ of 400° C.

EXAMPLE 16

A polyester was prepared by performing a reaction in a similar manner as in Example 13, except that 5.05 g of 5,7-dimethyltricyclo[3.3.1.1$^{3,7}$]decane-1,3-dicarboxylic acid was used as the dicarboxylic acid component. The resulting polymer had an Mn of 26000, an Mw/Mn of 2.5, a Tg of 77° C. and a Td$_5$ of 410° C.

EXAMPLE 17

A polyester was prepared by performing a reaction in a similar manner as in Example 13, except that 4.09 g of bicyclo[4.4.0]decane-1,6-diol and 5.05 g of 5,7-dimethyltricyclo[3.3.1.1$^{3,7}$]decane-1,3-dicarboxylic acid were used as the diol component and the dicarboxylic acid component, respectively. The resulting polymer had an Mn of 5000, an Mw/Mn of 2.6, a Tg of 162° C. and a Td$_5$ of 380° C.

EXAMPLE 18

Previously, tricyclo[3.3.1.1$^{3,7}$]decane-1,3-dicarbonyl chloride was prepared by allowing tricyclo[3.3.1.1$^{3,7}$] decane-1,3-dicarboxylic acid to react with thionyl chloride and purifying the reaction product by distillation. In a 50-ml flask in an atmosphere of dried nitrogen gas, 2.61 g of the tricyclo[3.3.1.1$^{3,7}$]decane-1,3-dicarbonyl chloride and 10 mL of dried monochlorobenzene were placed. To the resulting mixture, a solution mixture of 1.68 g of tricyclo [3.3.1.1$^{3,7}$]decane-1,3-diol and 5 mL of dried pyridine was added dropwise at room temperature over 5 minutes with stirring. After the completion of addition, the resulting mixture was allowed to react at 80° C. for 2 hours. After the completion of polymerization, the reaction mixture was added dropwise in small increments to 500 ml of methanol. The resulting polymer was filtrated, was rinsed with methanol, was dried in vacuo and thereby yielded a white polyester. The polymer had an Mn of 12000, an Mw/Mn of 2.5, a Tg of 131° C. and a Td$_5$ of 400° C.

EXAMPLE 19

A polyester was prepared by performing a reaction in a similar manner as in Example 18, except that 1.96 g of 5,7-dimethyl-tricyclo[3.3.1.1$^{3,7}$]decane-1,3-diol was used as the adamantanediol. The resulting polymer had an Mn of 9000, an Mw/Mn of 2.3, a Tg of 188° C. and a Td$_5$ of 405° C.

EXAMPLE 20

Previously, 5,7-dimethyltricyclo[3.3.1.1$^{3,7}$]decane-1,3-dicarbonyl chloride was prepared by allowing 5,7-dimethyltricyclo[3.3.1.1$^{3,7}$]decane-1,3-dicarboxylic acid to react with thionyl chloride and purifying the reaction product by distillation. A polyester was prepared by performing a reaction in a similar manner as in Example 18, except that 2.89 g of the 5,7-dimethyltricyclo[3.3.1.1$^{3,7}$]decane-1,3-dicarbonyl chloride and 1.96 g of 5,7-dimethyl-tricyclo [3.3.1.1$^{3,7}$]decane-1,3-diol were used as the dicarboxylic acid component and the diol component. The resulting polymer had an Mn of 6000, an Mw/Mn of 2.3, a Tg of 200° C. and a Td$_5$ of 415° C.

Other embodiments and variations will be obvious to those skilled in the art, and this invention is not to be limited to the specific matters stated above.

What is claimed is:

1. A polyester being a polycondensation product of (i) a diol component and (ii) a dicarboxylic acid component, wherein:

the diol component (i) comprises a tricyclo[3.3.1.1$^{3,7}$] decanediol represented by following Formula (1):

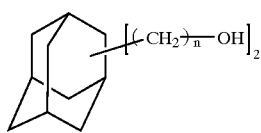

(1)

wherein n is 0 or a positive integer, and carbon atoms constituting a ring may each have a substituent; or the dicarboxylic acid component (ii) comprises a tricyclo [3.3.1.1$^{3,7}$]decanedicarboxylic acid represented by following Formula (2):

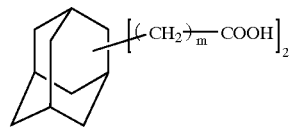

(2)

wherein m is 0 or a positive integer, and carbon atoms constituting a ring may each have a substituent.

2. The polyester according to claim 1, wherein:

the diol component (i) comprises a tricyclo[3.3.1.1$^{3,7}$] decanediol represented by following Formula (1):

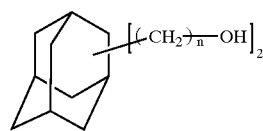

(1)

wherein n is 0 or a positive integer, and carbon atoms constituting a ring may each have a substituent; and the dicarboxylic acid component (ii) comprises a tricyclo [3.3.1.1$^{3,7}$]decanedicarboxylic acid represented by following Formula (2):

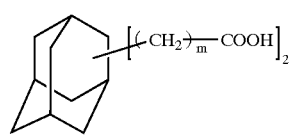

(2)

wherein m is 0 or a positive integer, and carbon atoms constituting a ring may each have a substituent.

3. The polyester according to claim 1, wherein:

the diol component (i) comprises a tricyclo[3.3.1.1$^{3,7}$] decanediol of Formula (1) where n is 0 or 1; or the dicarboxylic acid component (ii) comprises a tricyclo [3.3.1.1$^{3,7}$]decanedicarboxylic acid of Formula (2) where m is 0 or 1.

4. The polyester according to claim 1, wherein:

the diol component (i) comprises a tricyclo[3.3.1.1$^{3,7}$] decanediol of Formula (1) where n is 0 or 1; and the dicarboxylic acid component (ii) comprises a tricyclo [3.3.1.1$^{3,7}$]decanedicarboxylic acid of Formula (2) where m is 0 or 1.

5. The polyester according to claim 1, wherein:

the diol component (i) comprises a tricyclo[3.3.1.1$^{3,7}$] decanediol of Formula (1) where n is 0; or the dicarboxylic acid component (ii) comprises a tricyclo [3.3.1.1$^{3,7}$]decanedicarboxylic acid of Formula (2) where m is 0.

6. The polyester according to claim 1, wherein:

the diol component (i) comprises a tricyclo[3.3.1.1$^{3,7}$] decanediol of Formula (1) where n is 0; and the dicarboxylic acid component (ii) comprises a tricyclo [3.3.1.1$^{3,7}$]decanedicarboxylic acid of Formula (2) where m is 0.

7. The polyester according to claim 1, wherein:

the diol component (i) comprises a tricyclo[3.3.1.1$^{3,7}$] decanediol represented by following Formula (1a):

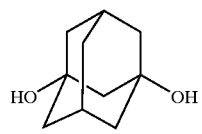

(1a)

wherein carbon atoms constituting a ring may each have a substituent; or the dicarboxylic acid component (ii) comprises a tricyclo[3.3.1.1$^{3,7}$]decanedicarboxylic acid represented by following Formula (2a):

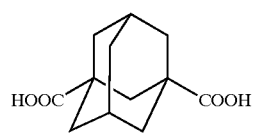

(2a)

wherein carbon atoms constituting a ring may each have a substituent.

8. The polyester according to claim 1, wherein:

the diol component (i) comprises a tricyclo[3.3.1.1$^{3,7}$]decanediol represented by following Formula (1a):

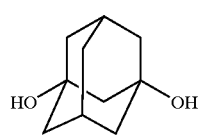

(1a)

wherein carbon atoms constituting a ring may each have a substituent; and the dicarboxylic acid component (ii) comprises a tricyclo[3.3.1.1$^{3,7}$]decanedicarboxylic acid represented by following Formula (2a):

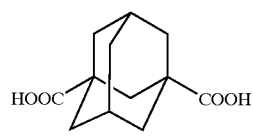

(2a)

wherein carbon atoms constituting a ring may each have a substituent.

9. The polyester according to claim 1, wherein the number average molecular weight of the polyester falls within a range from 1000 to 150000.

10. The polyester according to claim 1, wherein the number average molecular weight of the polyester falls within a range from 3000 to 100000.

11. A process for producing a polyester, the process comprising the step of:

subjecting a diol component (i) to polycondensation with a dicarboxylic acid component (ii) or a reactive derivative thereof, wherein:

a diol component comprising a tricyclo[3.3.1.1$^{3,7}$]decanediol represented by following Formula (1):

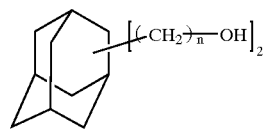

(1)

wherein n is 0 or a positive integer; and carbon atoms constituting a ring may each have a substituent, is used as the diol component (i); or a dicarboxylic acid component comprising a tricyclo[3.3.1.1$^{3,7}$]decanedicarboxylic acid represented by following Formula (2):

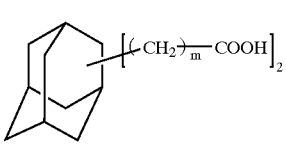

(2)

wherein m is 0 or a positive integer; and carbon atoms constituting a ring may each have a substituent, is used as the dicarboxylic acid component (ii).

12. The process according to claim 11, wherein:

a diol component comprising a tricyclo[3.3.1.1$^{3,7}$]decanediol represented by following Formula (1):

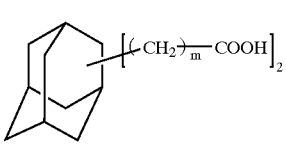

(1)

wherein n is 0 or a positive integer; and carbon atoms constituting a ring may each have a substituent, is used as the diol component (i); and a dicarboxylic acid component comprising a tricyclo[3.3.1.1$^{3,7}$]decanedicarboxylic acid represented by following Formula (2):

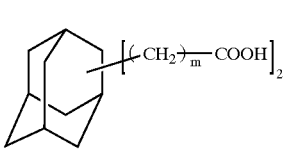

(2)

wherein m is 0 or a positive integer; and carbon atoms constituting a ring may each have a substituent, is used as the dicarboxylic acid component (ii).

13. The process according to claim 11, wherein:

a diol component comprising a tricyclo[3.3.1.1$^{3,7}$]decanediol represented by following Formula (1a):

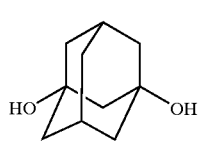

(1a)

wherein carbon atoms constituting a ring may each have a substituent, is used as the diol component (i); or a dicarboxylic acid component comprising a tricyclo [3.3.1.1³,⁷]decanedicarboxylic acid represented by following Formula (2a):

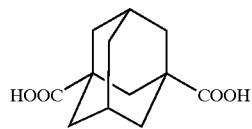
(2a)

wherein carbon atoms constituting a ring may each have a substituent, is used as the dicarboxylic acid component (ii).

14. The process according to claim 11, wherein:

a diol component comprising a tricyclo[3.3.1.1³,⁷] decanediol represented by following Formula (1a):

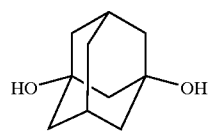
(1a)

wherein carbon atoms constituting a ring may each have a substituent, is used as the diol component (i); and a dicarboxylic acid component comprising a tricyclo [3.3.1.1³,⁷]decanedicarboxylic acid represented by following Formula (2a):

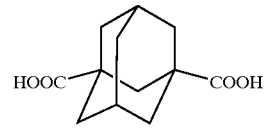
(2a)

wherein carbon atoms constituting a ring may each have a substituent, is used as the dicarboxylic acid component (ii).

* * * * *